United States Patent [19]

Janovtchik

[11] 4,160,002

[45] Jul. 3, 1979

[54] STEAM INJECTORS

[76] Inventor: Viacheslav J. Janovtchik, 16, Hedley Ct., 67 Putney Hill, London SW15 3NS, England

[21] Appl. No.: 945,994

[22] Filed: Sep. 26, 1978

Related U.S. Application Data

[63] Continuation of Ser. No. 804,657, Jun. 8, 1977, abandoned.

[30] Foreign Application Priority Data

Jun. 9, 1976 [GB] United Kingdom ............... 23895/76

[51] Int. Cl.² ............................................. B01F 3/04
[52] U.S. Cl. ....................................... 261/76; 99/453; 99/467; 99/483; 261/DIG. 76; 426/474; 422/307
[58] Field of Search .......... 261/76, 115, 118, DIG. 10, 261/DIG. 13, DIG. 32, DIG. 33, DIG. 26, DIG. 16, DIG. 75, DIG. 76; 99/453, 467, 483; 426/474; 21/56, 57

[56] References Cited

U.S. PATENT DOCUMENTS

| 366,169 | 7/1887 | Hyatt ................................ 261/76 X |
|---|---|---|
| 1,494,917 | 5/1924 | Kirgan .................................. 261/76 |
| 1,494,944 | 5/1924 | Bancel .................................. 261/76 |
| 2,344,536 | 3/1944 | Coey et al. ........................ 21/57 X |
| 3,193,257 | 7/1965 | Kingma ........................... 261/76 X |
| 3,219,483 | 11/1965 | Goos et al. ................. 261/DIG. 10 |
| 3,450,022 | 6/1969 | Engel .................................. 99/453 |
| 3,732,851 | 5/1973 | Self ............................. 261/DIG. 13 |
| 3,749,378 | 7/1973 | Rhodes ....................... 261/DIG. 75 |

FOREIGN PATENT DOCUMENTS

| 160092 | 12/1954 | Australia ..................................... 21/56 |
|---|---|---|
| 1420635 | 1/1976 | United Kingdom ...................... 99/453 |

*Primary Examiner*—Richard L. Chiesa
*Attorney, Agent, or Firm*—Sughrue, Rothwell, Mion, Zinn and Macpeak

[57] ABSTRACT

A steam injector, more particularly for use in the food and chemical industries for heating flowable product such as milk, comprises a stack of discs in an injection chamber. Central holes in the discs together define a central passage for the flowable product, and parallel chordal channels in each disc permit steam injection into the central passage.

7 Claims, 4 Drawing Figures

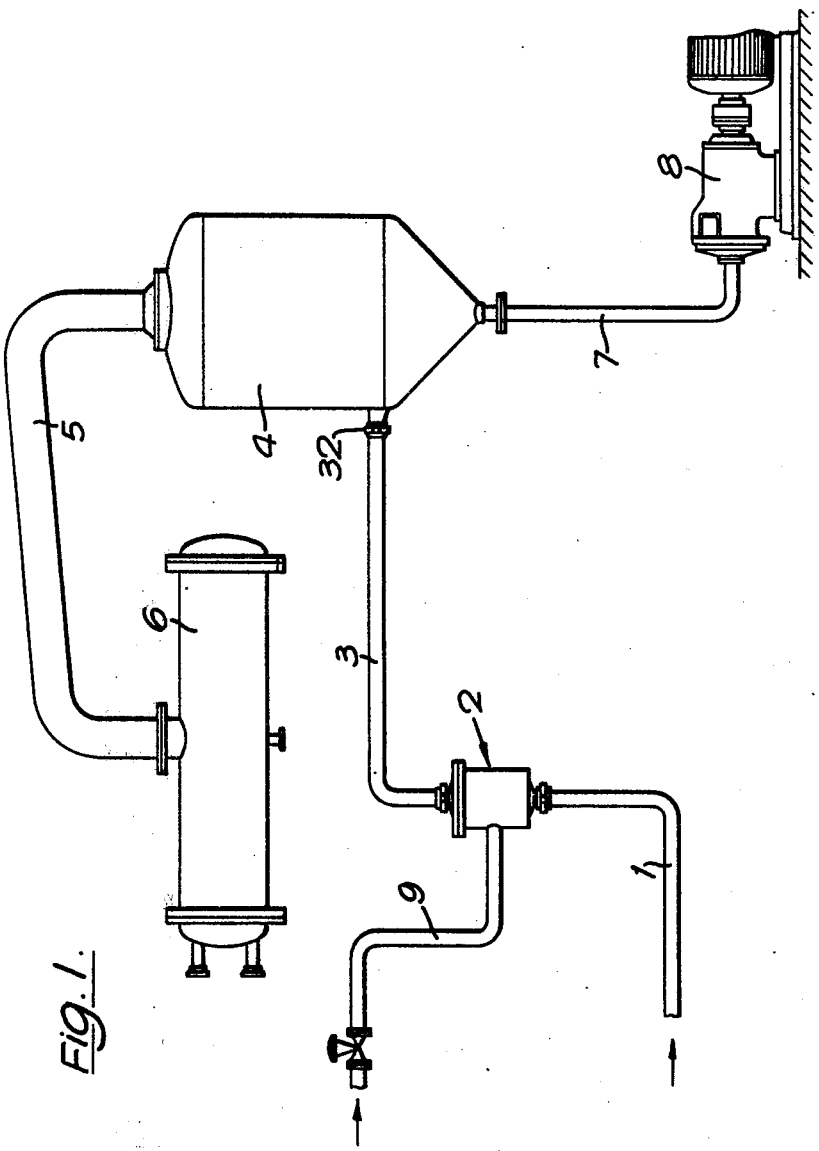

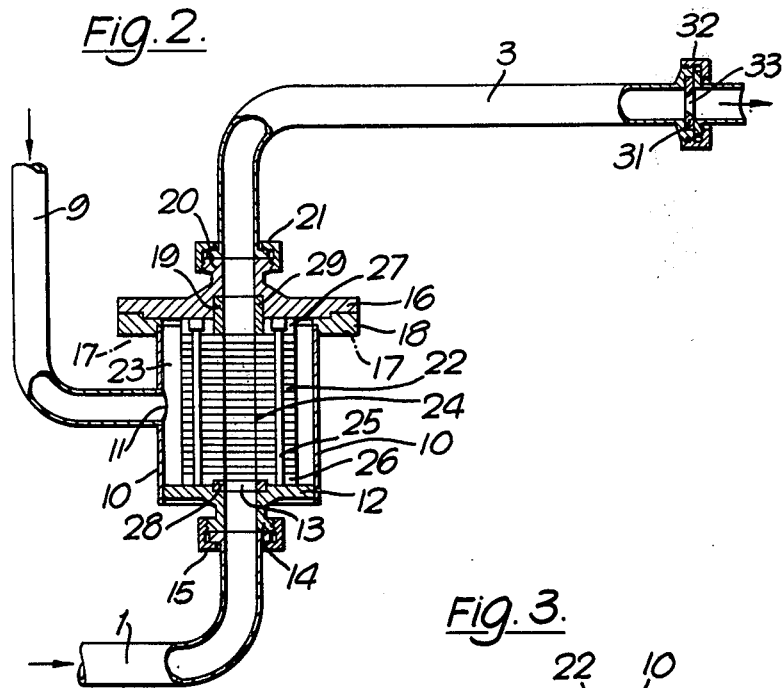
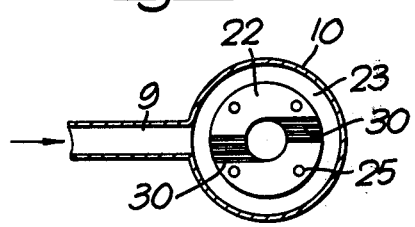
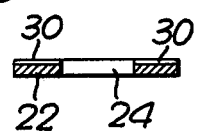

STEAM INJECTORS

This is a continuation, of application Ser. No. 804,657, filed June 8, 1977, and now abandoned.

BACKGROUND OF THE INVENTION

This invention relates to steam injectors, and more particularly to steam injectors of the kind used in the food and chemical industries for heating flowable materials. Such steam injectors are used for heating or sterilizing liquids or fluidised particulate or comminuted products.

The invention is particularly concerned with steam injectors for use in the heat treatment of milk in the production of long life milk.

The main object of the invention is to provide an improved steam injector which has an improved heat treatment efficiency and which does not produce any deterioration in the product being heated.

A further object of the invention is to provide a steam injector which can be used for an extended run of operation without having to be cleaned.

SUMMARY

The invention provides a steam injector for heating a flowable material, for example milk, comprising an injection chamber, and a stack of discs within the chamber. Each disc has a central hole, and the holes define a central passage aligned at one end with an inlet for the product to be heated and at the other end with an outlet for the treated product. One face of each disc is formed with a plurality of parallel chordal channels which run from the periphery of the disc to the central hole. Steam under pressure is maintained around the stack of discs and is injected through the chordal channels into the product flowing through the central passage.

In a preferred contruction the parallel chordal channels are located to communicate with diametrically opposed regions of the central passage and thereby enhance turbulence in the product. The discs are preferably made of a heat resistant plastics material, for example polytetrafluoroethylene.

BRIEF DESCRIPTION OF THE DRAWINGS

An embodiment of the invention will now be described, by way of example, with reference to the accompanying drawings in which:

FIG. 1 illustrates diagrammatically part of apparatus for sterilizing milk including a steam injector according to the invention, FIG. 2 is a vertical section through a steam injector used in the apparatus of FIG. 1, FIG. 3 is a section on line III—III of FIG. 2, and FIG. 4 is a section on line IV—IV of FIG. 3.

DESCRIPTION OF THE PREFERRED EMBODIMENT

Part of a plant for milk processing for the production of long life milk is illustrated in FIG. 1. Milk to be sterilized is pumped on a pipe 1 to a steam injector according to the invention which is indicated generally by the reference 2. The supply pipe 1 is connected to the bottom of the steam injector and an outlet pipe 3 for the sterilized milk is connected from the top of the steam injector to a flash cooler 4. The flash cooler is connected by a duct 5 to a condenser 6 and an outlet pipe 7 from the bottom of the flash cooler is connected to a pump 8 which pumps the sterilized and cooled milk to homogenisation plant of known kind.

Steam under pressure is supplied to the steam injector 2 through a pipe 9 which is connected centrally of the injector. The construction of the steam injector is illustrated in more detail in FIGS. 2 to 4 and the injector includes an injection chamber defined within a cylindrical stainless steel wall 10. An aperture 11 halfway up the wall 10 is an inlet for steam under pressure and the steam supply pipe 9, also of stainless steel is joined integrally to the wall 10 at the aperture 11.

The injection chamber has the floor 12 which is welded to the wall 10 and has a central inlet aperture 13 extending through a central flanged bushing 14 to which the stainless steel milk supply pipe 1 is connected by a sealed joint 15.

The top of the injection chamber is closed by a lid 16 which is bolted, as indicated at 17 to an annular flange 18 which is welded to the top of the wall 10. These parts 16 and 18 are also of stainless steel. The lid has a central aperture 19 in an upstanding bushing 20 having a flange forming part of a connection with the stainless steel outlet pipe 3. The sealed joint is indicated at 21. A stack of discs 22 are housed within the chamber leaving a space 23 between the periphery of the stack of discs and the wall 10. This space 23 communicates with the inlet aperture 11 for steam under pressure. Each of the discs 22 has a central hole 24 and the holes of the discs together form a central passage through the stack which passage is of similar diameter to the inlet aperture 13 in the floor 12 of the injector and the outlet aperture 19 in the lid 16 of the injector. The discs are made of a heat resistant plastics material preferably polytetrafluoroethylene. Another material which may be used is polychlorotrifluoroethylene. The discs 22 of the stack are held together by bolts 25 which pass through aligned holes in the discs between upper and lower plates 26 and 27 which are also of polytetrafluoroethylene and which have apertures aligned with the central passage through the stack of discs. A sealing gland ring 28 is compressed between the bottom plate 26 and the floor 12 of the injection chamber to provide a seal around the inlet for the milk to be processed. There is a similar sealing gland ring 29 between the upper plate 27 and the lid 16 to provide a seal around the outlet for the sterilized milk. Both the sealing glands 28 and 29 may also be of polytetrafluoroethylene.

One face of each disc, in the embodiment described the upper face, is formed with a plurality of parallel chordal channels 30 running from the periphery of the disc to the central hole 24. In the embodiment illustrated there are eight such channels in each disc arranged in two groups of four channels. The groups of channels are located to communicate with diametrically opposed regions of the central passage 24. This enhances turbulence of the liquid flowing upwardly through the central passage 24.

The discs are compressed together by the bolts acting between the plates 26 and 27 and in operation with milk to be sterilized being pumped upwardly through the central passage and steam under pressure supplied by pipe 11 to the space 23 around the stack of discs, there is steam injection through the chordal channels 30 causing turbulence in the milk being pumped upwardly through the central passage. The steam condenses into the milk and heats the milk to a temperature such that the milk is sterilized at the same time producing a highly turbulent action which results in efficient sterilization.

The sterilized milk passes through the outlet pipe 3 to the flash cooler which removes water introduced as the steam condenses in the milk being sterilized. Pressure is maintained in the pipe 3 and in the central passage through the discs 22 by a restrictor disc 31 also of polytetrafluoroethylene which is held in a joint 32 of the pipe 3 near the flash cooler 4. The restrictor disc 31 has a central aperture 33 through which the milk flows to the cooler.

Because the discs 22 are made of a "non-stick" material there is little tendency for the products being processed to form deposits on the discs. This has been a problem in the past when using a steam injector embodying highly polished stainless steel discs. A deposit of the product, particularly milk, has been known to form on such stainless steel discs after a few hours of operation, which deposit becomes burnt during the heat treatment with the result that the milk is contaminated and has a burnt taste. Not only do the grooved discs of the steam injector according to the present invention give an improved efficiency of sterilization, but also they avoid the problem of milk contamination by burnt particles because of the "non-stick" property of the discs.

It has been found that the steam injector of the invention can operate non-stop for up to 70 to 80 hours when sterilizing milk in the production of long life milk and during this long period of operation the quality of the product remains consistently high without any trace of contamination by burnt particles.

The steam injector may also be employed for the sterilization of other liquids, for examply tomato and fruit juices or for the heat treatment of particulate or comminuted products, for example chopped vegetables or ground food products.

I claim:

1. A steam injector for heating a flowable product, comprising: a closed injection chamber having an inlet to said chamber for the product to be heated, an outlet from said chamber for the heated product, and an inlet for steam under pressure, a stack of planar discs held together within the chamber, between the product inlet and outlet with a space for steam under pressure around the periphery of the stack, each disc having a central hole, which holes define a central passage communicating at one end with said inlet for the product to be heated and at the other end with said outlet for the treated product, the planes of the discs being perpendicular to the direction of flow of the product, one face of each disc being formed with a plurality of non-radial chordal channels running parallel to each other from the periphery of the disc to the central hole, the chordal channels being offset from the radial chords of the disc, and a steam supply pipe connected to the steam inlet to maintain steam under pressure in the space around the stack of discs for injection through the chordal channels into the product flowing through the central passage.

2. A steam injector according to claim 1, wherein the parallel chordal channels are located to communicate with diametrically opposed regions of the central passage and thereby enhance turbulence in the product.

3. A steam injector according to claim 1, wherein the discs are made of a non-stick heat resistant plastics material.

4. A steam injector according to claim 3, wherein the discs are made of polytetrafluoroethylene.

5. Apparatus for heat treating a flowable product, including a steam injector comprising: a closed injection chamber having an inlet to said chamber for the product to be heated, an outlet from said chamber for the heated product, and an inlet for steam under pressure, a stack of planar discs held together within the chamber between the product inlet and outlet with a space for steam under pressure around the periphery of the stack, each disc having a central hole, which holes define a central passage communicating at one end with said inlet for the product to be heated and at the other end with said outlet for the treated product, the planes of the discs being perpendicular to the direction of flow of the product, one face of each disc being formed with a plurality of non-radial chordal channels running parallel to each other from the periphery of the disc to the central hole, the chordal channels being offset from the radial chords of the disc, and a steam supply pipe connected to the steam inlet to maintain steam under pressure in the space around the stack of discs for injection through the chordal channels into the product flowing through the central passage.

6. A steam injector for sterilizing a flowable food product, comprising: a closed injection chamber having an inlet to said chamber for the food product to be sterilized, an outlet from said chamber for the sterilized food product, and an inlet for steam under pressure, a stack of planar discs of non-stick, heat resistant plastics material held together within the chamber between the product inlet and outlet with a space for steam under pressure around the periphery of the stack, each non-stick disc having a central hole, which holes define a central passage communicating at one end with the inlet for product to be sterilized and at the other end with the outlet for the sterilized product, the planes of the discs being perpendicular to the direction of flow of the product, one face of each disc being formed with a plurality of non-radial chordal channels running parallel to each other from the periphery of the disc to the central hole, the chordal channels being offset from the radial chords of the disc, and a steam supply pipe connected to the steam inlet to maintain steam under pressure in the space around the stack of discs for injection through the chordal channels into the product flowing through the central passage.

7. A steam injector according to claim 6, wherein the discs are made of polytetrafluoroethylene.

* * * * *